United States Patent [19]

Morales-Garza

[11] Patent Number: 5,101,267

[45] Date of Patent: Mar. 31, 1992

[54] WIDE AREA REAL-TIME T-V AUDIENCE POLLING SYSTEM WITH LOCAL AREA STATIONS LINKED BY SATELLITE

[75] Inventor: Fernando Morales-Garza, Monterrey, Mexico

[73] Assignee: TV Answer, Inc., Reston, Va.

[21] Appl. No.: 390,073

[22] Filed: Aug. 7, 1989

[51] Int. Cl.$^5$ .......................... H04B 17/00
[52] U.S. Cl. .......................... 358/84; 455/2; 455/5; 455/12
[58] Field of Search ............ 358/84, 86; 455/2, 4, 455/5, 6, 12; 370/95.1

[56] References Cited

U.S. PATENT DOCUMENTS

| | | | |
|---|---|---|---|
| 3,559,919 | 2/1971 | Sass | 343/705 |
| 4,451,700 | 5/1984 | Kempner et al. | 379/88 |
| 4,506,383 | 3/1985 | McGann | 455/17 |
| 4,591,906 | 5/1986 | Morales-Garza et al. | 358/84 |
| 4,630,108 | 12/1986 | Gomersall | 455/2 |
| 4,755,871 | 7/1988 | Morales-Garza et al. | 358/84 |
| 4,926,255 | 5/1990 | Von Kohorn | 358/84 |

Primary Examiner—Curtis Kuntz
Assistant Examiner—Edward Urban
Attorney, Agent, or Firm—Laurence R. Brown

[57] ABSTRACT

A network of local area audience response systems is coupled together at a central audience response processing station by means of a satellite communication system for real time audience response analysis, nationally or internationally. Each local area station and each response unit may be identified and verified by allocation of specific time slots for response, preferable synchronously related to a TV picture program transmission carrying the audience questions to be answered. Wireless transmission of the question and answer signals in digital format of beeps of a single frequency keep transmission channels narrow. The system may be operated in conjunction with TV broadcasting or independently.

52 Claims, 8 Drawing Sheets

REPEATER EQUIPMENT

ANSWERING DEVICE

POWER LEVEL AND FREQUENCY SYNTHESIZER

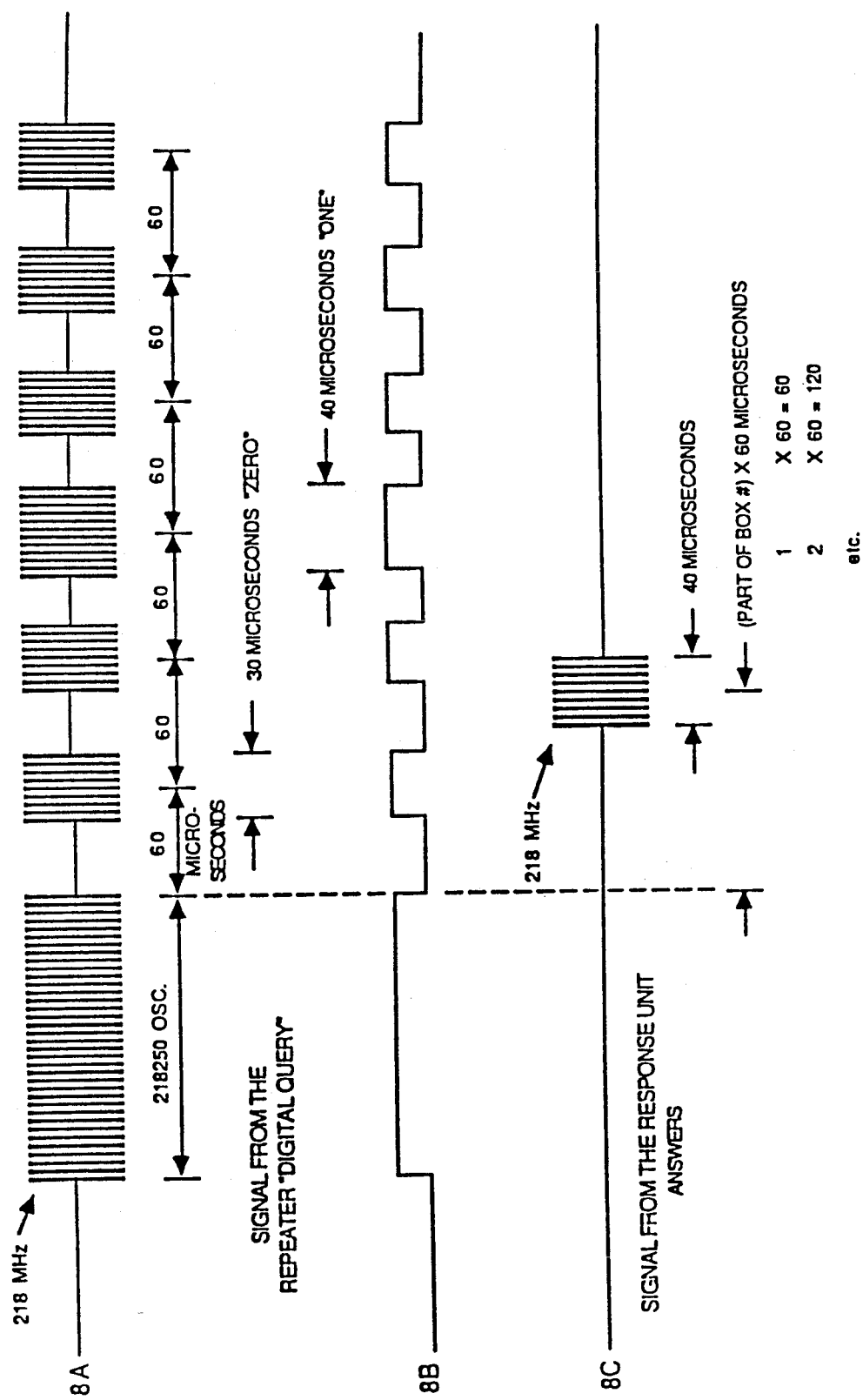

5,101,267

WIDE AREA REAL-TIME T-V AUDIENCE POLLING SYSTEM WITH LOCAL AREA STATIONS LINKED BY SATELLITE

TECHNICAL FIELD

This invention relates to two way audience polling communications between different audience response units such as TV receiver stations, and more particularly it relates to a communication system permitting questions to be sent to and answers to be received from individual response stations for processing at a central processing location.

BACKGROUND ART

Among prior art polling, voting and two-way communication systems is that of U.S. Pat. No. 4,591,906 to Fernando Morales-Garza, et al., May 27, 1986, which disclosure is incorporated herein entirety to simplify the scope of the present disclosure while enabling those in the art to practice this invention, and to better clarify the nature and scope of the present invention. That system permits answers to be sent by single frequency beeps from TV receiver audience response stations to a central processing station, at a TV transmitter studio site for example. Specific response time slots identify the answering units and compensation is made for travel time of the radio signals.

Also known in the art are various local remote control units for operational control of TV receivers by infra red (IR) wireless systems. One such system is that of co-pending application Ser. No. 07/368,951 filed June 13, 1989 by Fernando Morales, et al. for Wireless Remote Control of Cursor Superimposed on TV Picture, which permits answers to be formulated by a TV viewer in a specified location on a TV screen and transmitted to a central analysis station.

A system for processing of audience response answers at a central station is described in U.S. Pat. No. 4,755,871 to Fernando Morales-Garza, et al., July 5, 1988. This provides for inexpensive control of time slots at the response unit station by synchronization of timing with a TV program signal incorporating an audience question.

However, these prior art systems have not been able to process answers over a wide territorial range, such as for example nationally over the fifty states of the USA, or internationally for real time analysis.

It is therefore a general objective of this invention to provide a wireless communication system for audience polling, processing, analyzing and identifying responses, capable of feeding back verified responses for the information of the polled audiences, either together with a transmitted TV program or independently in an audience polling mode of operation.

A more specific objective of this invention is to use narrow band rf communication beeps capable of identifying responder TV stations, or the like, with time slot identification over wider territorial ranges than those of the aforesaid U.S. Pat. No. 4,591,906, for example for nation-wide or international polling with current polled results appropriately analyzed and verified.

Another specific objective of this invention is to provide by means of satellite communications a wireless processing system for real time audience polling over long distances, wherein specific TV receiver station, or like, response units can be identified, verified and analyzed for real time processing of responses from polled audiences.

Other objects, features and advantages of the present invention will be found throughout the following description, drawings and claims.

DISCLOSURE OF THE INVENTION

A set of local area audience analysis repeater stations, each communicate with a family of response units operating on the beep principle of U.S. Pat. No. 4,591,906. Questions and answers are communicated, processed and verified over local areas such as surrounding a TV transmitter site, with the capability of isolating and identifying each response unit in the audience. The repeater stations then communicate by intermediate satellite transmission channels to a central data center that receives the local signals to consolidate them into a nation-wide response result, for example. The data center also can process questions directed to the repeaters for local polling in the individual time slots identifying each of the response units, which are typically TV receiver stations. Further verification, formatting, repeating and storage of answers, and real time feedback of response data to the polled audience takes place at the data center, typically a national or international processing station. Local response units are compatibly operated at the response unit site with cable systems, VCR systems and radio TV signals from local transmitters. Preferably these response units are controlled by way of wireless remote control units using infra red communication links. Frequency synthesizing equipment at the response unit sites keep the cost of response units low while accurately controlling the timing of ID time slots and system synchronization. Travel time of radio waves is accounted for in the system to provide accurate identity of the individual response units through assigned synchronous time slots.

The questions and answers are digitalized in local data processors for synchronous system transmission and for satellite communication purposes. They are sent on a single frequency narrow band radio transmission channel. Real time clock signals are incorporated into the system along with the questions to identify real-time responses for verification of responses that might include erroneous answers from VCR or re-broadcast signals at the response unit site.

Typically this system may be used for national or international audience polling, for weather condition polling, for price or market surveys and other financial data processing, or for educational purposes such as grading examinations from a network of colleges or other schools, as well as for billing and accounting purposes for receipt of special programs. It is unique in that data from a plurality of local areas is assembled by way of satellite transmission channels for producing a large polling area suitable for national or international audience surveys with real time processing making possible relay of current responses to the polled audience.

BRIEF DESCRIPTION OF THE DRAWINGS

Throughout the drawings similar reference characters are used to facilitate comparison between the respective figures and system elements. In the drawings:

FIG. 8 is a waveform chart outlining operational features of the repeater station equipment.

THE PREFERRED EMBODIMENTS

Figure 1:
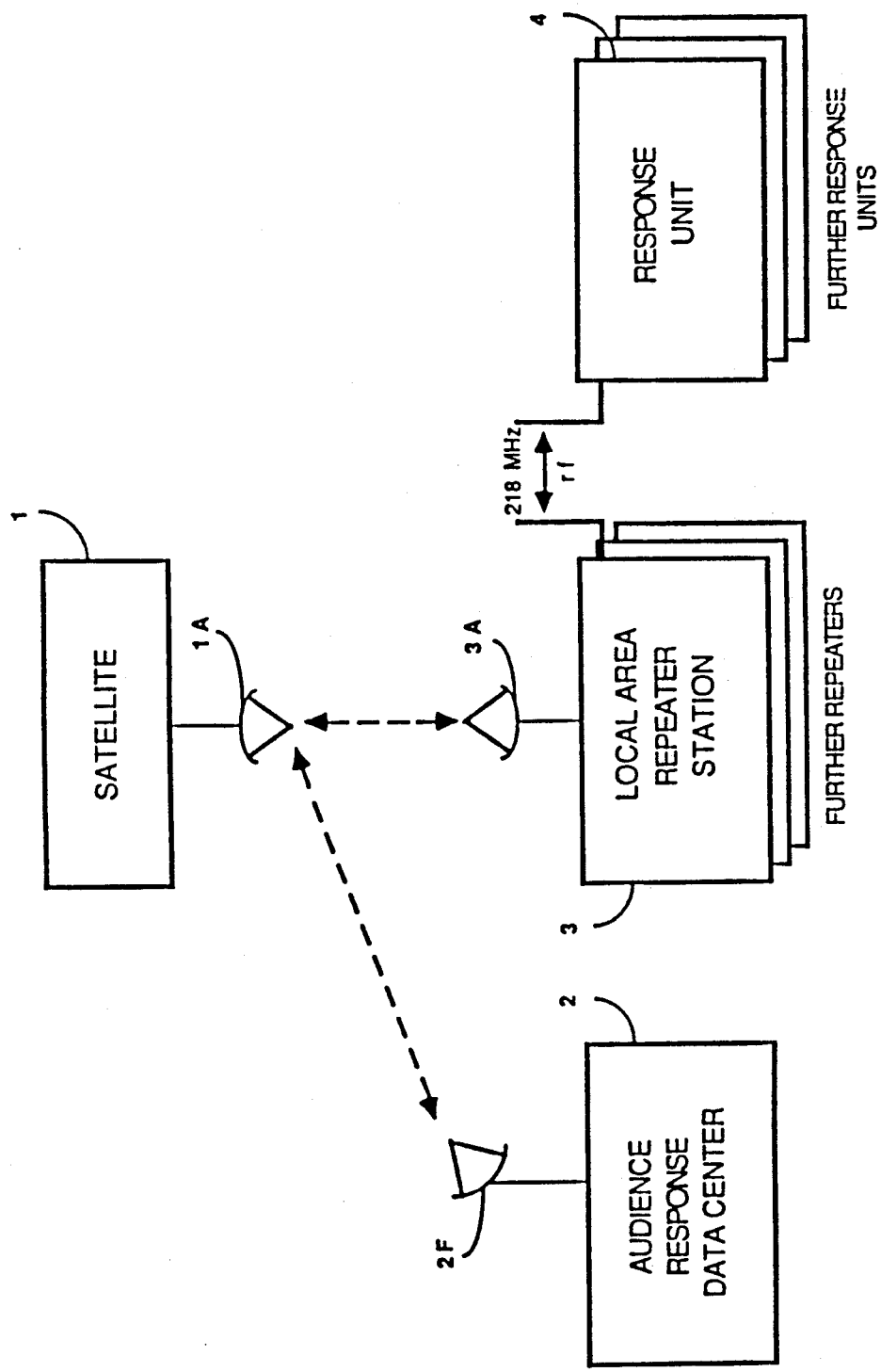
FIG. 1 is a block system diagram of the satellite communication audience polling system afforded by this invention.

In FIG. 1, the general system organization of the wide area satellite communication audience response system afforded by this invention is shown. The satellite station 1 through conventional communication channel links receives and repeats or retransmits data in either direction between the audience polling data center 2 and the local area repeater stations 3 by means of directional antennas 1A, 2F and 3A respectively. The audience polling data center thus is not restricted in location and may for example be a national or international audience polling center for communication with a set of local area audience polling repeater stations 3 located typically in cellular array locations throughout the designated area coverted by the data center 2.

The audience polling questions and answers are centrally transmitted and received at the data center 2 for verification, processing, formatting, storage and if desired for retransmission in real time to the audience being polled. Thus questions are transmitted from the data center to the local area repeater stations via antenna 2F to the satellite antenna 1A and then to the local station antenna 3A. These questions may be formulated as part of a TV picture, or may be explicitly an audience polling system separate from TV programming.

The local repeater stations, for example at one site, then locally process the questions and answers on a narrow band single frequency channel, such as 218 MHz, in the form of beeps located in timing slots explicitly identifying the various response units 4 being processed in a local family audience, for billing, identification and verification purposes. Thus, the audience response is returned in real time through satellite station 1 to the central data center 2, with processing and verification at both the local area repeater stations 3 and the data center 2, where system wide audience response data may be analyzed and formatted. The directional parabolic antennas 2F and 3A from specific locations establish a system in which widely separated local area repeater stations can be coordinated and processed from a single central data center and control station.

Figure 2:
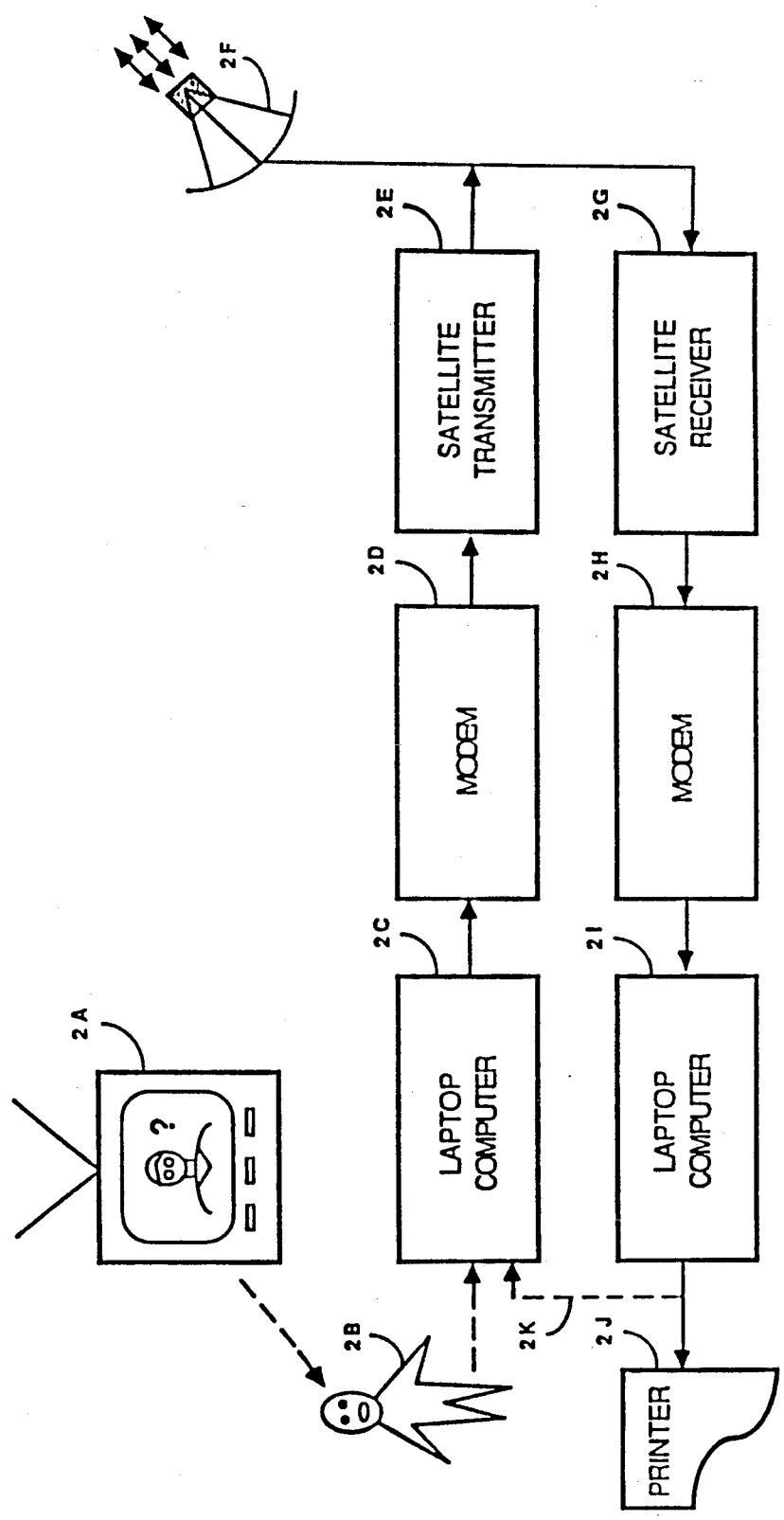
FIG. 2 is a block system diagram afforded by this invention of a data processing center for sending audience questions and receiving audience responses from a plurality of localized systems, such as city TV station audiences, to produce nationwide audience response data, for example.

At the data center 2, as shown in FIG. 2, a question (?) that may be associated with a TV picture on the TV receiver 2A screen is converted by operator 2B or corresponding automated equipment into a synchronously timed digital signal fashioned for processing in the audience response system, such as that in the U.S. Pat. No. 4,591,906. In a semi-automatic system as shown, the operator by way of a personal computer 2C for example programs the digital question data which via modem 2D, transmitter 2E and directional antenna 2F is communicated on a transmission link through a satellite station 1, and to all the response units using a plurality of repeater stations 3. The response units answer the question using a specific time slot for each one, similar to the system described in the U.S. Pat. No. 4,591,906.

Similarly answers, verified at local repeater stations, are received from the satellite communication link at receiver 2G for processing through modem 2H and computer 2I for formatting and printout at printer 2J for example. The answers may also be incorporated in the TV picture signal going out for the benefit of real time monitoring by the polled audiences, as indicated by connection 2K.

Figure 3:
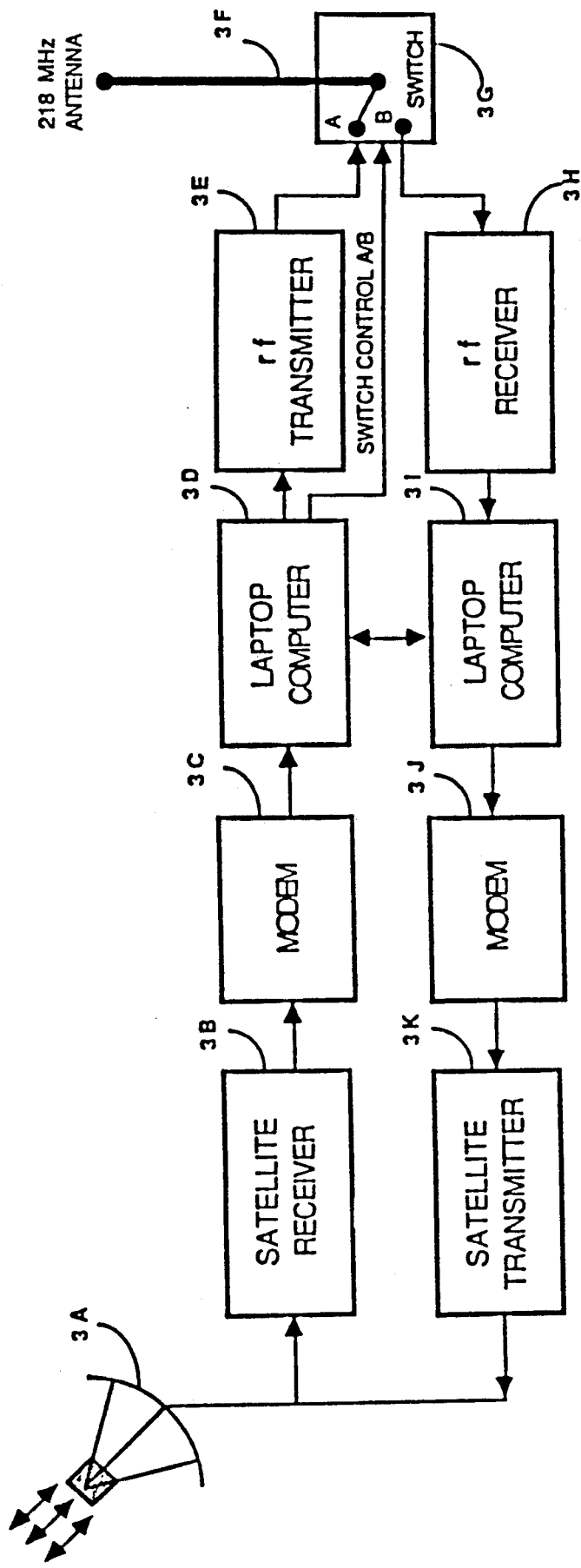
FIG. 3 is a block system diagram of local area repeater station equipment afforded by this invention to service local audience questions and responses.

Typical local area repeater transceiving equipment is shown in FIG. 3. Thus signals (questions) received from the satellite at antenna 3A are processed in receiver 3B, modem 3C, computer 3D and local rf transmitter 3E operating at 218 MHz for transmission from antenna 3F. In this transmitting mode the transmit-receive switch 3G is set to transmit position A. The reception default mode of switch 3G at B permits reception of answers at receiver 3H for verification and processing through computer 3I, modem 3J and transmitter 3K which communicates with the satellite data processing link. Summary or totalized audience response may be derived at computer 3I for example and verified. Satellite based discrimination equipment may distinguish between the transmissions from various local repeater stations to prevent interference or to permit simultaneous transmissions on separate frequency bands for example. Preferably narrow band beep signals of the type disclosed previously are employed with all local repeater stations communicating on the same narrow frequency band through the satellite station. In this respect the local repeater stations all may be identified and slot time controlled in communicating to the central data station in the manner set forth in U.S. Pat. No. 4,591,906.

Figure 4:
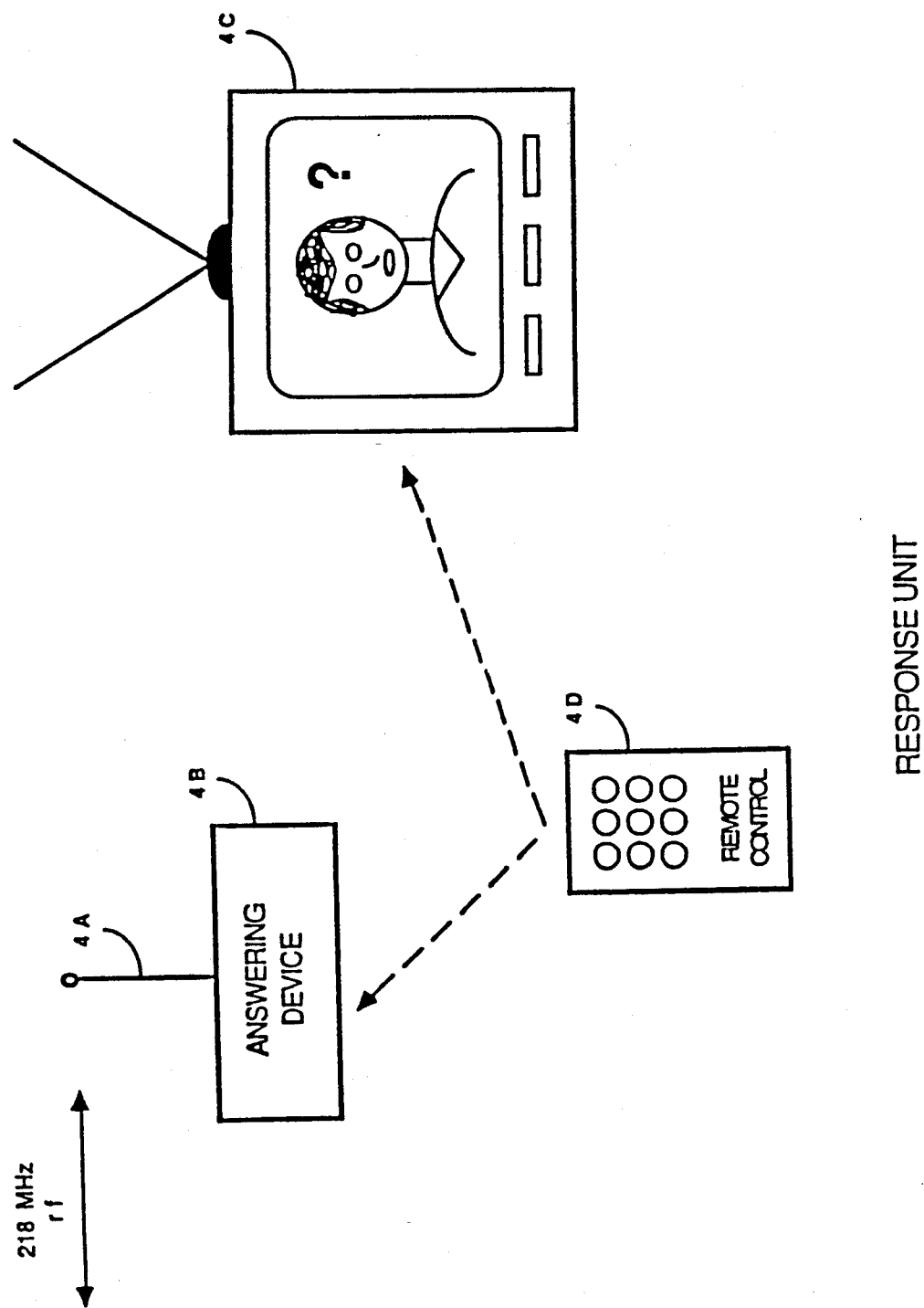
FIGS. 4 and 5 are block diagrams of several response unit embodiments afforded by this invention, typically TV receiver stations about a local TV transmitting station site provided with audience response processing equipment.

A simplified response unit is shown in FIG. 4, where a remote control unit 4D synchronously operated with the TV receiver 4C may provide answers through answering device 4B, preferably that of the aforementioned copending application, to be sent to the local repeater station on the 218 MHz beep frequency channel from the response unit transmitting antenna 4A.

Figure 5:
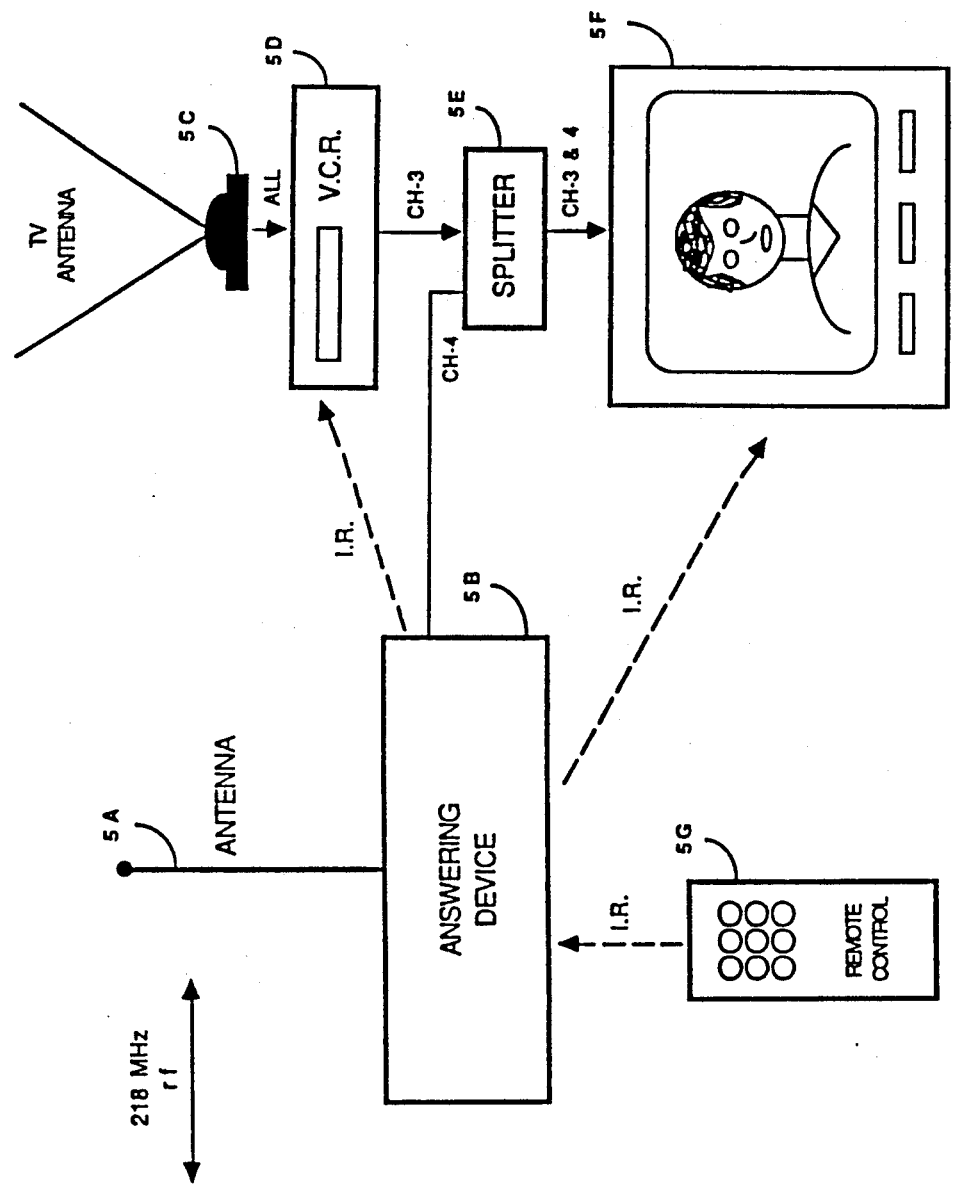

In the response unit of FIG. 5, the answering device 5B may operate independently from a TV program signal format, and may isolate its own TV channel using for example the frequency of channel 4, which can be mixed with other channels in conventional splitter 5E to provide a suitable presentation on the screen of TV set 5F. Thus the system is compatible with cable converter 5H, local rf broadcast signals received on antenna 5C and VCR 5D, all of which may operate conventionally on channel 3.

The responses are preferably made by IR wireless remote control unit 5G which controls answering device 5B for formulating response beeps for transmission at antenna 5A on the 218 MHz beep channel to the local repeater station.

Figure 6:
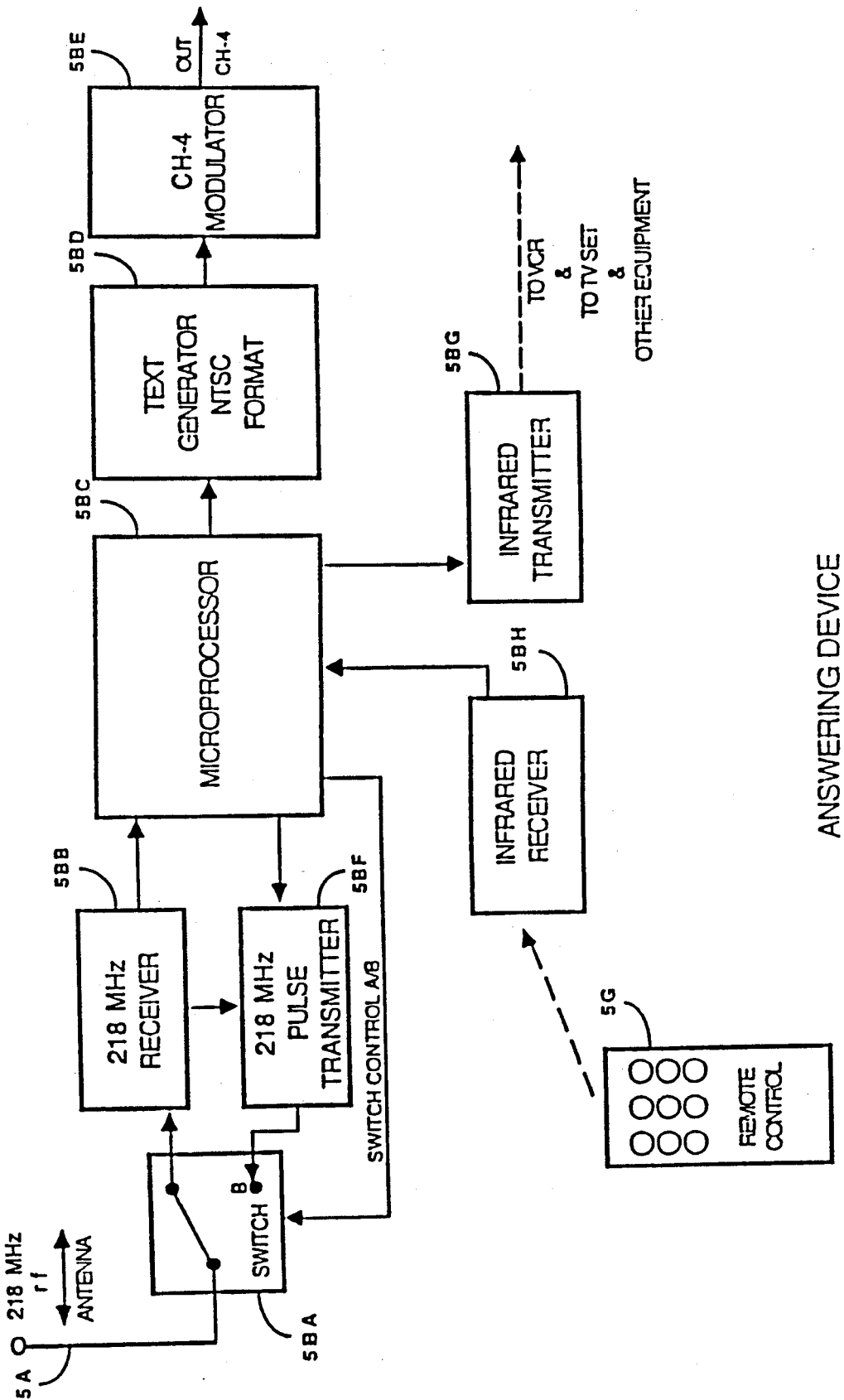
FIGS. 6 and 7 are block diagrams of some elements of the answering device of the audience response unit as afforded by this invention.

A preferred system for the response system is shown in FIG. 6. The antenna 5A receives information from the local repeater station and by way of transceiver switch 5BA selects receiver 5BB for processing incoming signals for use by microprocessor 5BC, which retains the signals in its memory. If the data comprises a real time question, the microprocessor 5BC is programmed to read the infrared receiver 5BH and relay through pulse transmitter 5BF and switch 5BA the response beeps to the repeater station.

For information related to TV scheduling sent to the receiver 5BB and retained in the storage of microprocessor 5BC, the text generator 5BD and channel 4 modulator 5BE presents the viewer appropriate information and sets the equipment to accept corresponding responses from the viewer unit 5G. The remote control device 5G also serves by way of infrared transmitter 5BG to control channel changes in the TV set, and to control the VCR and any other IR responsive local equipment at the response unit station.

Figure 7:
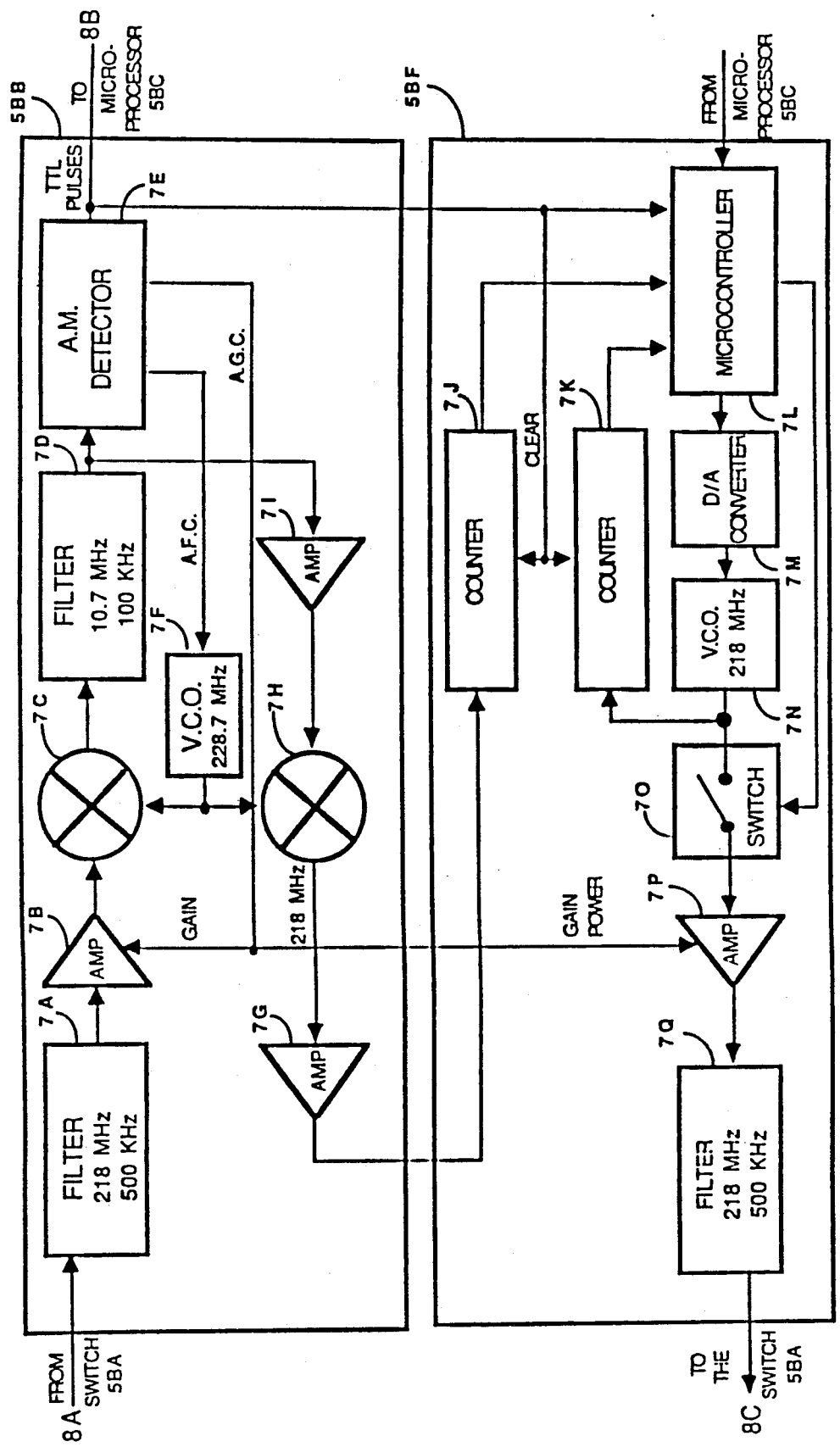

In FIG. 7 details of the transmitter 5BF and receiver 5BB are provided to both control the power for different strength signals received and to control the synchronization of the pulse time slots by synthesizing the received signal as a reference frequency, in similar manner disclosed in U.S. Pat. No. 4,755,871. As viewed with the waveforms of FIG. 8, the incoming rf signal 8A from the local repeater staion is processed in filter 7A to remove any interfering signals. Amplifier 7B by way of an AGC control circuit generates a standard level signal at mixer 7C. Using filter 7D and a m detector 7E, a signal 8B is generated for use in the microprocessor 5BC.

The a m detector 7E also generates AGC and AFC signals for gain and frequency control purposes to fine tune the voltage controlled oscillator (VCO) 7F, and to control the gain of amplifiers 7B and 7P. Thus, the locally controlled or synthesized frequency at 7F is mixed again with the signal 8A at mixer 7H and amplified at 7G for processing in counter 7J to count the number of oscillations. This counter 7J and also counter 7K are cleared every time the signal 8B returns to zero.

Counter 7K counts the oscillations from VCO 7N as an inut to microcontroller 7L, which by way of digital to analog converter 7M controls the transmission frequency of VCO 7N by comparing the counts on the two counters. Only when the counts are equal can the microcontroller transmit a radio frequency pulse 8C using switch 7O and power amplifier 7P as filtered through narrow band filter 7Q. Thus the output beep pulse to the local repeater station is carefully controlled in frequency and amplitude.

The signal 8A coming from the satellite preferably contains a coded real time clock signal inserted at the data center computer with the question for verification of live real time conditions by comparing the question and answer times in a clock portion of the microprocessor 5BC at the response unit or in the computer 3I of the local repeater station.

It is therefore evident that this invention advances the state of the art and provides a simple operative audience response communication system that can operate in real time nationally or internationally through satellite communication channels that gather signals from a set of local audience response processing and repeater stations for consolidation in a central data processing center. Therefore the features of novelty believed descriptive of the spirit and scope of the invention are defined with particularity in the following claims.

I claim:

1. An audience response communication system, comprising in combination, a communication satellite, a plurality of local area audience response stations each communicating with a family of response units in the local area of the respective response stations to process live audience response questions and answers,
a central audience response processing station for communicating with the said plurality of audience response stations to provide audience response data from a plurality of local areas, and
satellite communication means providing communication channels employing the satellite for sending question signals from the central audience response processing station to the local audience response stations and receiving audience response signals derived from the local area response stations and transmitting such audience response signals to the central processing station.

2. The system defined in claim 1, wherein said satellite communication means further comprises two way communication means for processing audience questions from the central station to the local stations and audience responses from the local stations to the central station on a single satellite communication channel.

3. The system defined in claim 2, wherein said satellite communication means comprises digital processing means and the questions and answers comprise digital signals.

4. The system defined in claim 1 wherein said audience response questions are transmitted with TV programs, and the audience response units comprise TV receiver stations.

5. The system defined in claim 1 wherein said local stations include radio transmission and reception means for communicating with their respective response units.

6. The system defined in claim 1 wherein each of the local stations is identified by a synchronously located transmission time slot for transmitting beeps in a single frequency band to the central station.

7. The system defined in claim 1 further comprising, means to provide real time clock signals transmitted with questions on the communication channels, and verification means for comparing answer times with the clock signal.

8. The system defined in claim 1 wherein the plurality of local response stations communicate to their respective family of response units on the same frequency band.

9. The system defined in claim 8 wherein the frequency band is a narrow band channel for transmitting rf beeps of a controlled single frequency as digital information between the local stations and their respective families of response units.

10. The system defined in claim 8 wherein the frequency band includes a frequency in the order of 218 MHz.

11. The system defined in claim 1 further comprising means at the central processing station for transmitting questions to all the local area stations and for receiving responses from all the local area stations and processing the responses to produce an audience response survey.

12. The system defined in claim 1 further comprising means to retransmit processed audience response results back to an audience being polled over said communication channels.

13. The system defined in claim 1 wherein the local area stations have computer means for processing and verification of audience response signals received from their respective families of response units.

14. The system defined in claim 1 wherein the local area stations further comprise transceiver equipment for receiving from the satellite and processing questions formulated by the central station and for receiving, processing and transmitting to the satellite responses to said questions from their respective families of response units.

15. The system defined in claim 1 wherein said response units further comprise a television receiver for receiving and displaying the questions from the central station, and response means for transmitting answers back to their respective local area response stations.

16. The system defined in claim 1 wherein each response unit is identified by a specified time slot for submitting a digital response signal and means for synchronizing the time slot for responding with the original signal.

17. The system defined in claim 16 wherein each response unit transmits response signals to its respective local area station as digital beep signals of a single specified frequency.

18. The system defined in claim 17 wherein the response units further comprise means for compensating for radio wave travel time of signal transmissions in the local area surrounding the respective local area response station.

19. The system defined in claim 1 wherein the plurality of local area audience response stations communicate responses through said satellite communication channels by means of beep digital signals of a single frequency timed in time slots for identifying each of the local area stations.

20. The system defined in claim 1 wherein the response units further comprise, multiple channel TV receivers, and means for isolating audience response communications in a specified TV signal channel processed by the TV receivers, and means for confining other TV signals for processing by the TV receiver into other TV channels than said specified TV channel.

21. The system of claim 1 further comprising means located in the area of the local response stations for generating a TV picture format for presentation at the response units on a TV receiver and incorporating thereinto a question to be answered.

22. The system of claim 21 wherein the response units further comprise said means for generating the TV picture format.

23. The system of claim 1 further comprising transmission means in said central processing station for incorporating questions into TV picture programs communicated over said communication channels.

24. The system of claim 23 wherein said response units further comprise, means for deriving response unit timing control signals from the TV picture programs incorporating the questions.

25. The system of claim 1 including means for processing questions and answers at the local area stations between said response units and said local area stations as digital beep pulses, and wherein said response units further comprise means for receiving and transmitting said pulses and gain control means for standardizing pulse amplitudes received by and transmitted from the response units.

26. An audience response communication system, comprising in combination, a communication satellite,
a plurality of local area audience response stations each communicating with a family of response units in the local area of the respective response stations to process live audience response questions and answers,
a central audience response processing station for communicating with the said plurality of audience response stations to provide audience response data from a plurality of local areas,
satellite communication means providing communication channels employing the satellite for sending question signals from the central audience response processing station to the local audience response stations and receiving audience response signals derived from the local area response stations and transmitting such audience response signals to the central processing station,
wherein the response units further comprise, multiple channel TV receivers, means for isolating audience response communication in a specified TV signal channel processed by the TV receivers,
means for confining other TV signals for processing by the TV receiver into other TV channels than said specified TV channel, and
response means located at the response unit site operable to communicate with the TV receiver for control of channel selections therein and to process audience response signals in an answering device for transmission to the respective local area response stations.

27. The system of claim 26 further comprising IR wireless communication channels from the response means to the TV receiver and the answering device.

28. An audience response communication system, comprising in combination, a communication satellite,
a plurality of local area audience response stations each communicating with a family of response units in the local area of the respective response stations to process live audience response questions and answers,
a central audience response processing station for communicating with the said plurality of audience response stations to provide audience response data from a plurality of local areas,
satellite communication means providing communication channels employing the satellite for sending question signals from the central audience response processing station to the local audience response stations and receiving audience response signals derived from the local area response stations and transmitting such audience response signals to the central processing station,
wherein said local stations include radio transmission and reception means for communicating with their respective response units, and
means for adjusting the power output of the transmission means in the local station inversely dependent on the received signal.

29. An audience response communication system, comprising in combination, a communication satellite,
a plurality of local area audience response stations each communicating with a family of response units in the local area of the respective response stations to process live audience response questions and answers,
a central audience response processing station for communicating with the said plurality of audience response stations to provide audience response data from a plurality of local areas,
satellite communication means providing communication channels employing the satellite for sending question signals from the central audience response processing station to the local audience response stations and receiving audience response signals derived from the local area response stations and transmitting such audience response signals to the central processing station, transmission means in said central processing station for incorporating questions into TV picture programs communicated over said communication channels, said response units further comprising, means for deriving response unit timing control signals from the TV picture programs incorporating the questions, and means for adjusting output frequency of a transmitter in the response unit, by counting the received frequency in a predetermined period of time and comparing with the transmitter output frequency.

30. The method of processing real time audience response analysis from a plurality of local areas distributed over an extensive area comprising the steps of:

providing a set of local area question and answer processing audience response units and a local area response unit processing station communicating with the audience response units to determine local area audience response, providing a central audience response data processing station for processing the audience response from all the local area stations, and providing a satellite communication system between said central station and the local area stations with means for processing audience responses over said extensive area in real time.

31. The method of claim 30 including the step of distributing said plurality of local area stations throughout a national network of audience response stations.

32. The method of claim 30 including the step of distributing said plurality of local area stations internationally.

33. A network for processing audience response signals between audience response units located in a plurality of local regions extended over a comprehensive region encompassing the local regions, comprising in combination, digital communication means and equipment including, a central data processing station, a satellite station digital processing communication channel coupled from the central data processing center to a plurality of local area repeater stations, all including means to process and communicate bidirectionally between the respective stations live audience question and answer data, and a family of local response units with digital communication means for communicating with each respective repeater station, each having means for processing digital signals to receive questions and answers from other stations and response units in the network.

34. The network of claim 33 further comprising, manually operated means for introducing questions into said network from said central processing station as digital communication signals.

35. The network of claim 33 further comprising digital transceiver data processing means in the repeater stations for processing questions and answers in communications channels between individual response units and the satellite station.

36. The network of claim 33 further comprising a 218 MHz bidirectional communication channel between respective ones of the repeater stations and response units in their respective familiies of response units.

37. The network of claim 33 further comprising at the response units a television receiver, and means for isolating audience response communications from said network for processing on a single designated channel by the television receiver.

38. The network of claim 33 further comprising at the response units a television receiver, and signal conversion means for translating digital audience response signals in said network into a format compatible with processing on said receiver.

39. The network of claim 38 wherein said signal conversion means further comprises means for converting digital audience response signals into television text format for viewing on the television receiver.

40. The network of claim 33 further comprising, means for transmitting said digital signals as beeps of a carrier frequency signal, and receiver means at the audience response units for processing the carrier frequency signal to time digital audience response signals transmitted over said network to the response unit.

41. The network of claim 33 further comprising means for accompanying digital audience response signals communicated in said network with a real time clock signal.

42. The network of claim 33 further comprising means for receiving digital communications from an audience response unit, processing the communications and sending the communications over the network to at least one other response unit.

43. The network of claim 42 including identification means for identifying individual response units from communications being processed in the network carried along with responses and questions originating at the individual response units.

44. The network of claim 43 wherein said identification means further comprises time slot control means for allocating specific time slots to different response units within a family of response units located in a local area.

45. A satellite communication station coupled by a communication channel link in said satellite station with a network of local response units distributed over a wide geographic area having audience response processing equipment for processing audience response communications over said link between different local response units in said network, means for transmitting TV communications over said link to the response units, said local response units comprising a multiple channel TV receiver connected for operation from the TV communications, an answering device at the TV receiver site, and response means located at the response units operable to communicate with the TV receiver for control of channel selections therein and to process audience response signals from said answering device for transmission to local response units of said network.

46. A satellite communication station coupled by a communication channel link in said satellite station with a network of local response units distributed over a wide geographic area having audience response processing equipment for communicating with a TV receiver for control of channel selection and for processing audience response communications over said link between different local response units in said network, said local response units comprising an answering device and a TV receiver, and IR wireless communication means from the answering device to the TV receiver for displaying audience response communications on the TV receiver.

47. A satellite communication station coupled by a communication channel link in said satellite station with a network of local response units distributed over a wide geographic area having audience response processing equipment for processing audience response communications over said link between different local response units in said network, means for carrying audience responses on a predetermined carrier frequency over the link, means for synchronously operating the local response units with the carrier frequency, means for transmitting the audience response communications from the local response units at a predetermined transmission frequency, and means for synchronizing the transmission frequency with the carrier frequency in response to a count of the carrier frequency over a predetermined period.

48. The network of claim 47 further comprising a transmission frequency of 218 MH$_z$.

49. A satellite network of local response units connected in a communication network through a communication channel at a satellite transceiver station having an audience response processing link coupled for receiving and retransmitting audience response signals between response units in said network, wherein the processing link receives and retransmits the audience response signals as a part of a TV program communication received by a TV receiver at response unit sites, and response means at the response unit sites for communicating with the TV receiver for control of channel selections therein and to process audience response signals for transmission to other response units.

50. The system of claim 49 further comprising IR wireless communication channels from the response means to the TV receiver and the answering device.

51. A satellite network of local response units connected in a communication network through a communication channel at a satellite transceiver station having an audience response processing link coupled for receiving and retransmitting audience response signals between response units in said network, and means for retransmitting the response signals at a retransmitted frequency synchronized with a frequency upon which the signals are received on said link by means of counting the received frequency in a predetermined period of time and comparing with the retransmitted frequency.

52. The network defined in claim 51 wherein the retransmitted frequency is in the order of 218 MH$_z$.

* * * * *